Jan. 16, 1951  L. H. BROWN  2,537,962
SINGLE EYEPIECE BINOCULAR
Filed Sept. 3, 1947
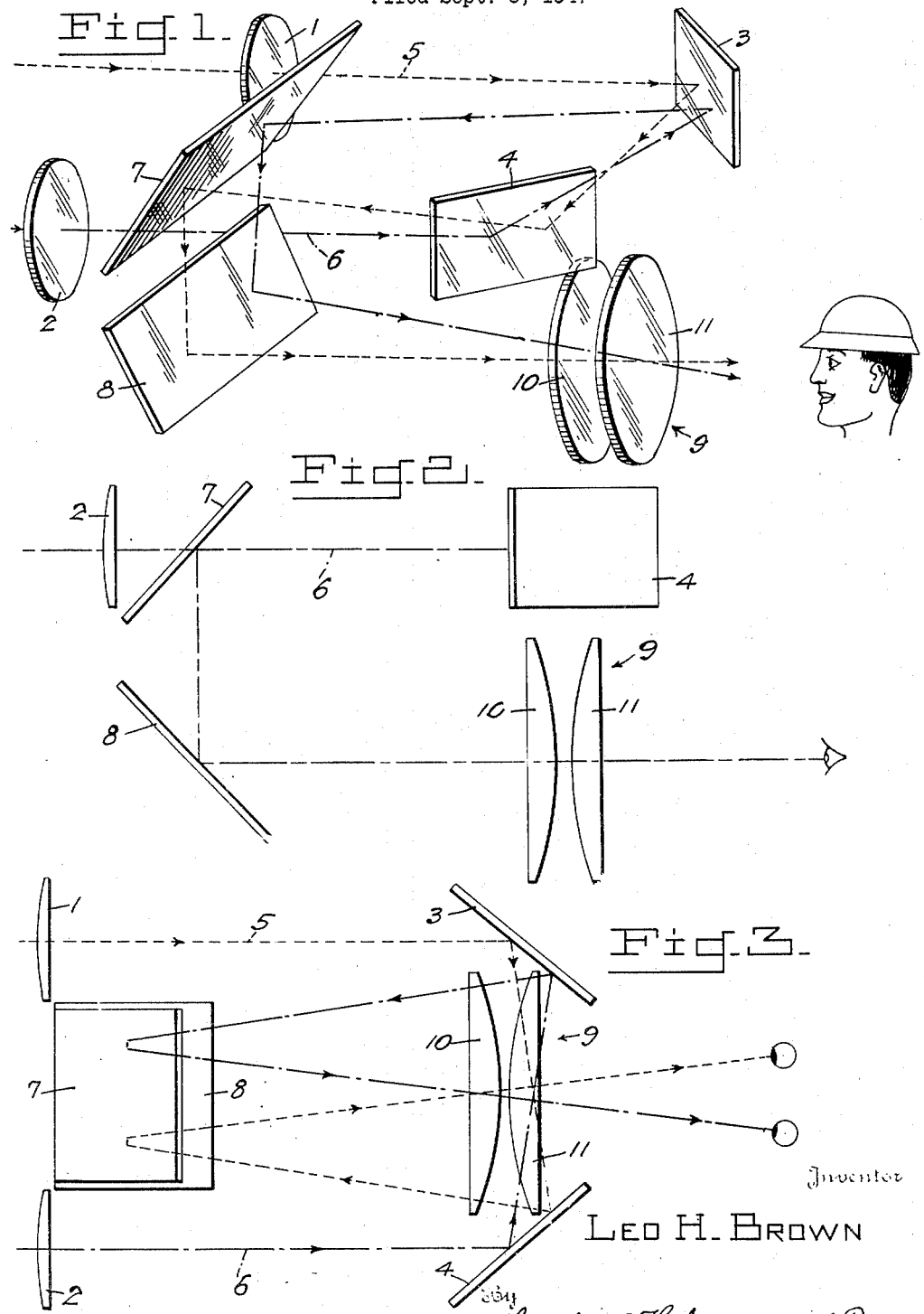
Inventor
LEO H. BROWN
J. H. Church, W. E. Thibodeau + A. W. Dew
Attorneys Patented Jan. 16, 1951

2,537,962

UNITED STATES PATENT OFFICE 2,537,962

SINGLE EYEPIECE BINOCULAR

Leo H. Brown, Glenville, Conn.

Application September 3, 1947, Serial No. 771,957

4 Claims. (Cl. 88—34)

(Granted under the act of March 3, 1883, as amended April 30, 1928; 370 O. G. 757)

The invention described in the following specification and claims may be manufactured and used by or for the Government for governmental purposes without the payment to me of any royalty thereon.

This invention relates to an optical instrument intended more particularly for use in military vehicles such as combat tanks.

Among the objects of the invention are:

To provide an optical instrument affording binocular stereoscopic vision with both eyes looking into a single large eyepiece;

To provide an instrument of the type aforesaid wherein a single erecting system is utilized, for both eyes with consequent fewer optical parts than in prior art devices of a like nature;

To provide a binocular telescope which is easy to look through because of the considerable latitude in the position of the observer's head;

To provide an optical instrument wherein simple uncorrected lenses may be used without serious aberrations;

To provide an optical instrument of the type mentioned which is relatively simple and inexpensive to construct and one which because of the substantial eye relief, may be used while the carrying vehicle is traversing rough terrain;

To provide an optical instrument which affords greater light transmission and better vision than comparable prior art sights.

Other objects and advantages will become apparent from a study of the following disclosure.

In the drawing:

Fig. 1 is a perspective diagrammatic view showing the arrangement of the optical elements and the path of the light rays therethrough;

Fig. 2 is an elevation corresponding to Fig. 1;

Fig. 3 is a plan corresponding to Figs. 1 and 2.

Referring in detail to the drawing, numerals 1 and 2 identify a pair of spaced coplanar objective lenses having a focal length which is long in relation to their aperture. A reflector, shown as a mirror 3, is positioned rearwardly of objective 1 across the principal axis 5 thereof and in position to reflect the rays proceeding therethrough to a second reflector 4 located transversely opposite reflector 3. As will be noted from Fig. 3, reflector 4 is positioned centrally across the principal axis of objective 2, and in the same angular relation with axis 6 as reflector 3 bears to axis 5. Thus the rays proceeding through objective 2, are reflected by reflector 4 to reflector 3.

From the figures, it will be noted that reflectors 3 and 4 are substantially normal to the plane determined by parallel axes 5 and 6.

From reflector 4, the rays proceeding through objective 1, are reflected forwardly onto a third reflector 7 conveniently located between objectives 1 and 2 and a little rearwardly of the plane of such objectives. Likewise, the rays proceeding through objective 2, are reflected, first by reflector 4 to reflector 3 and thence to reflector 7. It will be noted that the plane of reflector 7 is at 45° to the plane of axes 5 and 6 and that the line of intersection of the two planes is at right angles to such axes.

From reflector 7, the rays from both objectives are reflected downwardly onto a reflector 8 at 90° to reflector 7 and whose trace with the plane of axes 5 and 6 is at 90° to said axes.

From reflector 8, the rays are reflected rearwardly into eyepiece 9 comprising a field lens 10 and an eye lens 11. The diameter of lenses 10 and 11 is substantially greater than the interpupillary distance of an observer. The system also has substantial eye relief so that an observer looking into the eyepiece has a considerable latitude of movement of his head without losing sight of the object at which the telescope is aimed.

The focal length of objectives 1 and 2 is long in relation to their aperture so that simple uncorrected lenses may be used without introducing serious aberrations. Furthermore, the eyepiece is close to the focal plane of the objectives 1 and 2 thus limiting aberration. In the model shown the focal plane of objective lenses 1 and 2 may be on the plano surface of field lens 10. A reticle may also be located upon this surface.

I have thus provided a binocular telescope which is particularly useful when mounted upon a vehicle such as a tank, adapted to travel over rough terrain or when mounted upon a pedestal or tripod. The observer is enabled to view a magnified image of the object at a position removed from the eyepiece and over a considerable range of movement transversely of the eyepiece. This is of particular importance in vehicles such as tanks, where jars and shocks in passing over rough terrain make it difficult to maintain the head in a precise relation with respect to the eyepiece of a conventional telescope and create the hazard of injury to the observer.

While I have shown a preferred form of the invention, there is no intention to limit it to the particular embodiments herein shown. To the contrary it is my intention to cover all modifications and alternative constructions falling within the spirit and scope of the invention as expressed in the appended claims. Thus various types of known eyepieces may be substituted for the one shown, prisms may be used for one or more of the mirrors shown and the eyepiece may be located forwardly or rearwardly from the position shown, relatively to the objectives. This is true also of the reflectors. For these reasons, the disclosure should be taken in an illustrative rather than a limiting sense.

Having now fully disclosed the invention, what I claim and desire to secure by Letters Patent is:

1. In a binocular telescope, a pair of coplanar objectives laterally spaced in a first direction and having parallel principal axes defining a plane, a single eyepiece symmetrically positioned with respect to said objectives offset from said plane and with its principal axis parallel with the principal axes of said objectives, first and second reflectors each positioned to receive the rays from a respective objective and to reflect the same to the other of said first and second reflectors, a third reflector positioned between said objectives to receive the rays reflected forwardly thereonto from both of said first and second reflectors and to reflect the same substantially normal to said plane, and a fourth reflector positioned to receive the rays reflected from said third reflector and to reflect the same parallel with said plane rearwardly to said eyepiece.

2. A binocular telescope as in claim 1, the focal length of said objectives being long in relation to the apertures thereof, said eyepiece having a diameter substantially greater than the interpupillary distance of an observer.

3. A binocular telescope according to claim 1, said eyepiece comprising a field lens and an eyelens, said objectives having their focal plane in the forward surface of said field lens.

4. In a binocular telescope spaced right and left coplanar objectives having parallel principal axes determining a plane, first and second spaced reflectors, each positioned at 45° across a respective principal axis and normal to said plane, to receive rays from a respective objective and to reflect the same transversely of said principal axes and parallel with said plane to the other of said reflectors, a third reflector positioned forwardly of said first and second reflectors, substantially between said objectives, to receive rays reflected forwardly by both said first and second reflectors, a fourth reflector positioned in offset relation with said third mirror in a direction normal to said plane to receive and reflect rearwardly parallel with said plane, rays from said third reflector, and a single eyepiece comprising a field lens and an eyepiece, each having a diameter greater than the interpupillary dimension of an observer, said eyepiece being positioned to receive rays reflected by said fourth reflector said objectives having their foci in the forward surface of said field lens.

LEO H. BROWN.

REFERENCES CITED

The following references are of record in the file of this patent:

UNITED STATES PATENTS

| Number | Name | Date |
|---|---|---|
| 1,690,270 | Carssow | Nov. 6, 1928 |
| 1,840,878 | Abrams | Jan. 12, 1932 |
| 1,848,788 | Loeck | Mar. 8, 1932 |
| 2,284,562 | Dittman | May 26, 1942 |
| 2,374,027 | McMaster et al. | Apr. 17, 1945 |
| 2,410,757 | Street | Nov. 5, 1946 |